US007130882B1

(12) United States Patent
Hudis et al.

(10) Patent No.: US 7,130,882 B1
(45) Date of Patent: Oct. 31, 2006

(54) CACHING MECHANISM USING INTERVENING NETWORK CACHING POLICIES

(75) Inventors: Irena Hudis, Bellevue, WA (US); Alan Geoffrey Boshier, Redmond, WA (US); Lev Novik, Bellevue, WA (US); Yunxin Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 10/175,924

(22) Filed: Jun. 20, 2002

(51) Int. Cl.
*G06F 15/16* (2006.01)
(52) U.S. Cl. .................. 709/203; 709/221; 709/223
(58) Field of Classification Search .............. 709/203, 709/221, 223
See application file for complete search history.

(56) References Cited

U.S. PATENT DOCUMENTS 6,959,320 B1 * 10/2005 Shah et al. ................. 709/203
2002/0083183 A1 * 6/2002 Pujare et al. ............... 709/231

OTHER PUBLICATIONS

Optimal Caching Policies for Web Objects, M.D. Hamilton, P. McKee, I. Mitrani, High-Performance Computing and Networking. 9th International Conference, HPCN Europe 2001.,Proceedings (Lecture Notes in Computer Science vol. 2110), pp. 94-103.
Optimal Web Cache Sizing: Scalable Methods for Exact Solutions, T. Kelly, D. Reeves, Journal: Computer Communications Conference Title: Comput. Commun. (Netherlands) Feb. 1, 2001, vol. 24, No. 2, pp. 163-173.

* cited by examiner

*Primary Examiner*—Jason Cardone
*Assistant Examiner*—Adnan Mirza
(74) *Attorney, Agent, or Firm*—Workman Nydegger

(57) ABSTRACT

Caching mechanisms in which when a request to operate on particular identified network data is detected, the mechanism refers to a set of rules to determine whether to operate on a local copy of the identified network data, and whether to operate on the actual network data over the network. The set of rules are at least partially set by a human such as a user or network administrator, or perhaps by an application. The caching mechanism may optionally even block local read operations until the network data is synchronized with the remote copy of the network data. The mechanism may also block local write operations until synchronization is performed and/or the write operation is performed on the remote copy of the network data.

24 Claims, 5 Drawing Sheets

CACHING MECHANISM USING INTERVENING NETWORK CACHING POLICIES

BACKGROUND OF THE INVENTION

1. The Field of the Invention

The present invention relates to network caching mechanisms; and more specifically, to network caching mechanisms in which policies govern caching conditions.

2. Related Technology

Computing technology has transformed the way we work and play. Computer networking, in particular, allows individual computers to communicate information between each other. Computer networks can be conglomerated together to allow for expansive communication. The Internet, for example, is a well-known global computer network that consists of amalgamations of smaller interconnected networks.

One primary use of a network is to allow users or applications to access remotely-stored information. Remotely-storing information (as opposed to locally-storing the information on the local computer system) is advantageous in that it allows many computer systems access to the information. In addition, the local computer system need not waste memory resources (e.g., disk space or system memory) retaining the information unless the local computer system specifically requests the information be downloaded. Accordingly, only remotely-stored items that are interesting enough to be downloaded occupy memory resources.

Although networks are useful, remotely storing information does have its disadvantages. For example, there is sometimes a significant degree of latency in networks. In other words, it can take some time between the time information is requested, and the time the information is received. Also, the network bandwidth is limited. For example, it can take notable time to download larger pieces of information from (and upload such information to) the remote site. If the information was locally stored, however, there would be relatively little latency and bandwidth involved with the read/write channel from and to local memory.

Network caching is a known technology that balances the benefits of remotely-storing information on a network with the benefits of locally-storing information on the local computer system. In particular, when remotely accessing information, a copy of the information is made and stored locally. That copy represents the state of the information as it existed at the time the copy was made. Accordingly, when requesting the information, the local computer system may obtain the information from the locally-stored copy, rather than from the remote location. This allows for fast access times and preserves network bandwidth.

However, if new changes are made to the remotely-stored information, the local copy will not change absent synchronization of the information. Accordingly, the local copy is said to have a certain degree of staleness. Although accessing the cached copy of the information is fast, there is typically no guaranty that the information is still accurate as compared to the information that is remotely-stored.

Conventional network caching mechanisms may generally be broken down into two categories. One category of caching mechanism is illustrated in FIG. 1 as off-line caching mechanism 100. In the off-line caching mechanism 100, the application 110 obtains a local copy of data 111A from an off-line store 112. A remote service 113 stores a remote copy of data 111B. At the time of the last synchronization, the local copy of the data 111A was the same as the remote copy of the data 111B. A synchronization mechanism 114 facilitates the occasional synchronization of the remote copy of the data 111B with the local copy of the data 111A.

The off-line caching mechanism is advantageous in that it allows the application 110 to communicate with a local off-line store 112. Accordingly, access to the data occurs relatively quickly. However, the application 110 has little control over when the synchronization mechanism 114 performs synchronization.

Another conventional model is illustrated in FIG. 2 as the transparent caching mechanism 200. In this model, the application 210 makes requests for the remote data 211B and intends to communicate directly with the remote service 213 to make that request. This request and the corresponding response are represented by bi-directional arrow 215. However, unbeknownst to the application 210, the requests are intercepted by a local cache 212, which determines whether a local copy of the data 211A is available and sufficiently fresh to provide to the application 210, instead of going to the remote service 213 for the remote copy of the data 211B. If the local cache 212 has such a copy of the data, the local cache 212 returns a response back to the application 210. If not, the request is allowed to proceed to the remote service 213, which ultimately provides the corresponding response.

The transparent caching mechanism 200 has an advantage in that the application 210 accesses accurate data most of the time since the request will be satisfied by providing a remote copy of the data 211B or by providing a local copy of the data 211A, which is usually relatively fresh. However, the application 210 does not know whether the data returned in the response is a local copy of the data 211A or a remote copy of the data 211B. Accordingly, the application 210 does not know whether the data is completely fresh, or whether there is some staleness. Different applications may have different needs for how fresh the data should be. For example, suppose that the local copy of the data 211A is two hours old, this may be sufficiently fresh for an encyclopedia application, but may be too stale for other applications such as, for example, a stock ticker application that needs stock information that is no more than 15 minutes old.

BRIEF SUMMARY OF THE INVENTION

The principles of the present invention relate to mechanisms for allowing more flexibility and control as to when and what to cache over networks. When detecting a request to operate on particular identified network data, a caching mechanism refers to a set of rules to determine whether to operate on a local copy of the identified network data, and whether to operate on the actual network data over the network. The set of rules are at least partially set by a human such as a user or network administrator, or perhaps by an application. Accordingly, the user and application have much more control over caching.

The caching mechanism may also have blocking mechanisms for blocking requests to operate on local data. For example, when detecting a request to read a particular local copy of the network data, the caching mechanism may block the request, synchronize the remote and local copies of the network data, and then perform the read operation. Should synchronization fail when the read operation is blocked, then the read operation from the local copy may also be forced to fail.

When detecting a request to write to a particular local copy of the network data, the caching mechanism may also block the write request, perform the write request on the actual remotely-stored network data, and then perform the write request on the local copy of the network data. Should the write operation fail for the remotely stored network data, the write operation may also fail for the local copy of the network data. Accordingly, read and write operations may be implemented on the local copy of the network data, while making it more likely that such operations will quickly be reflected in the remote copy of the data.

These blocking operations are optional and are performed based on the settings in the set of rules. Accordingly, the blocking operations may be reserved for particular operations and data combinations in which it is more important for changes to be more immediately mirrored in the local and remote copies of the network data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for allowing more flexibility and control as to when and what to cache. When detecting a request to operate on particular identified network data, a caching mechanism refers to a set of rules to determine whether to operate on a local copy of the identified network data, and whether to operate on the actual network data over the network. The set of rules are at least partially set by a human such as a user or network administrator, or perhaps by an application. Accordingly, the user and application have much more control over caching.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
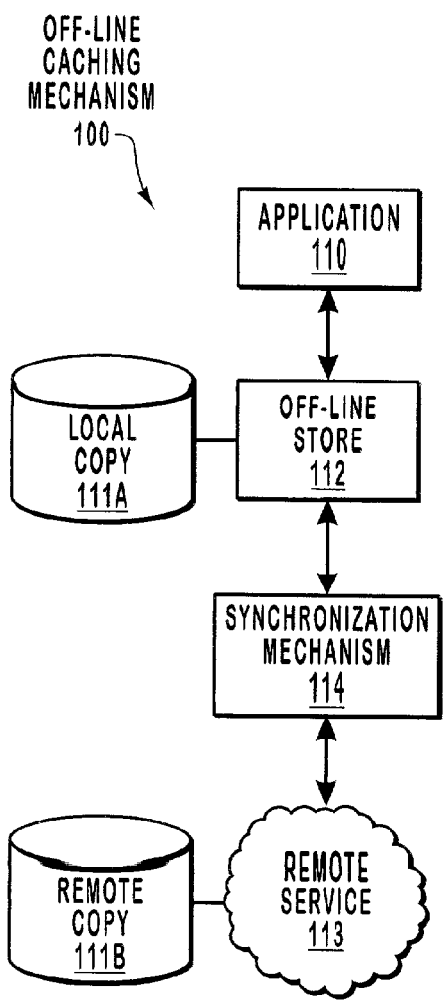
FIG. 1 illustrates a conventional off-line caching mechanism.
Figure 2:
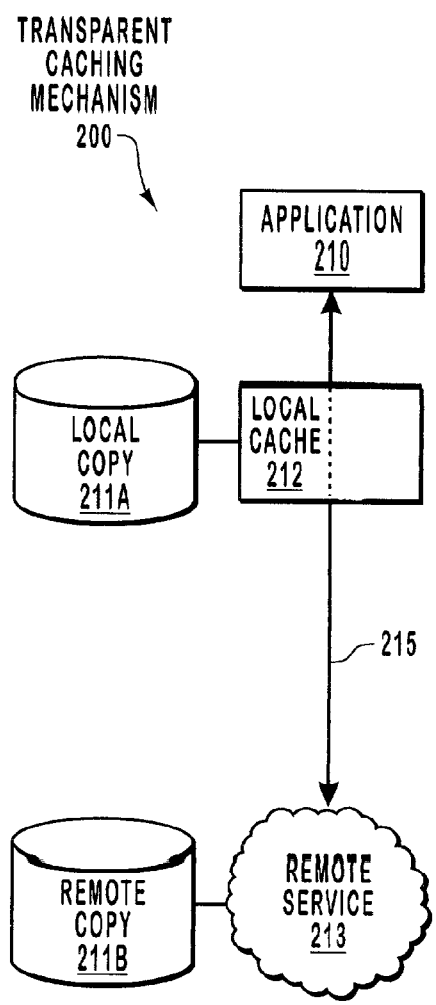
FIG. 2 illustrates a conventional transparent caching mechanism.
Figure 3:
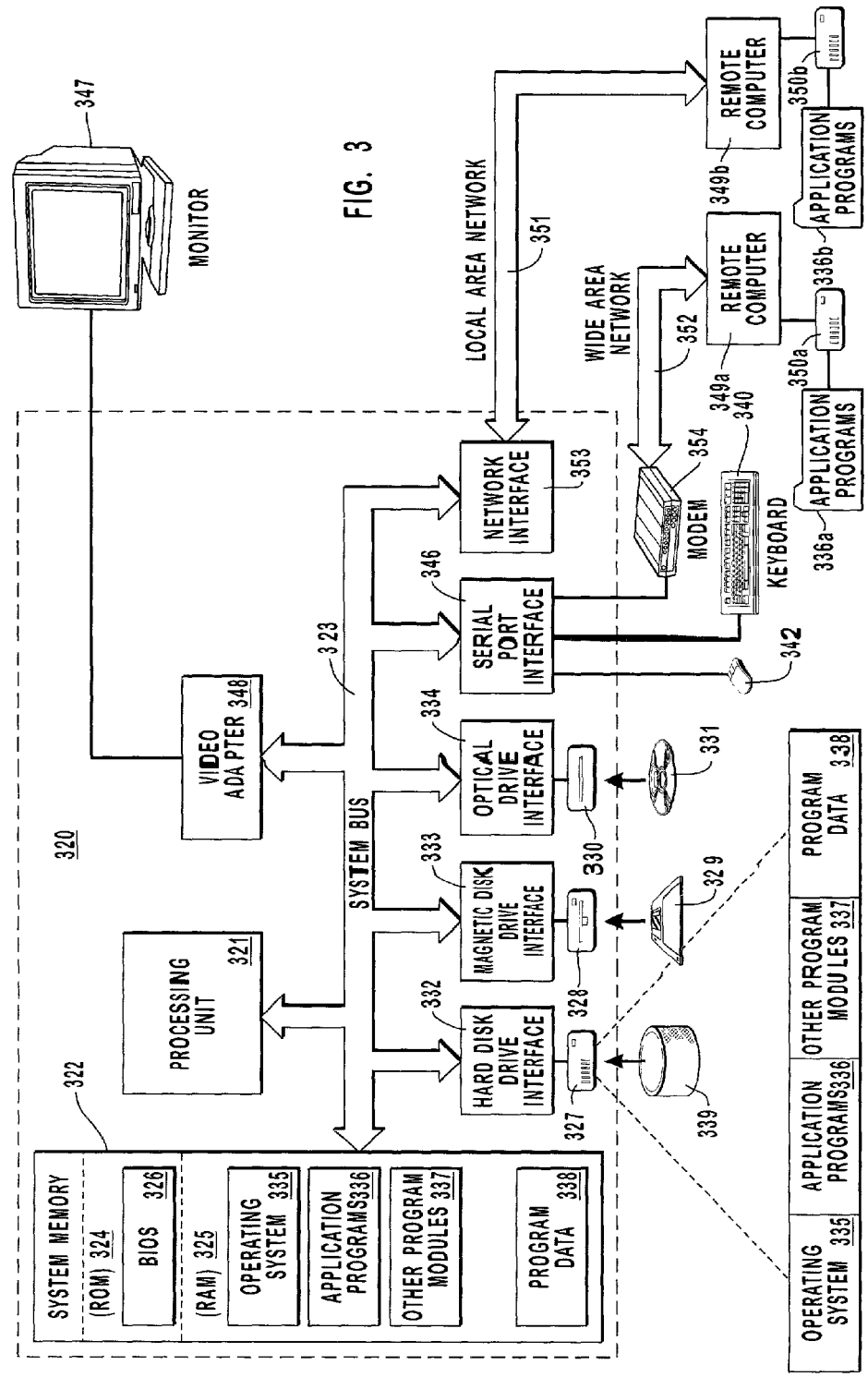
FIG. 3 illustrates a suitable computing system in which the principles of the present invention may be employed.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, and the like, that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an example system for implementing the invention includes a general purpose computing device in the form of a conventional computer 320, including a processing unit 321, a system memory 322, and a system bus 323 that couples various system components including the system memory 322 to the processing unit 321.

The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

Figure 4:
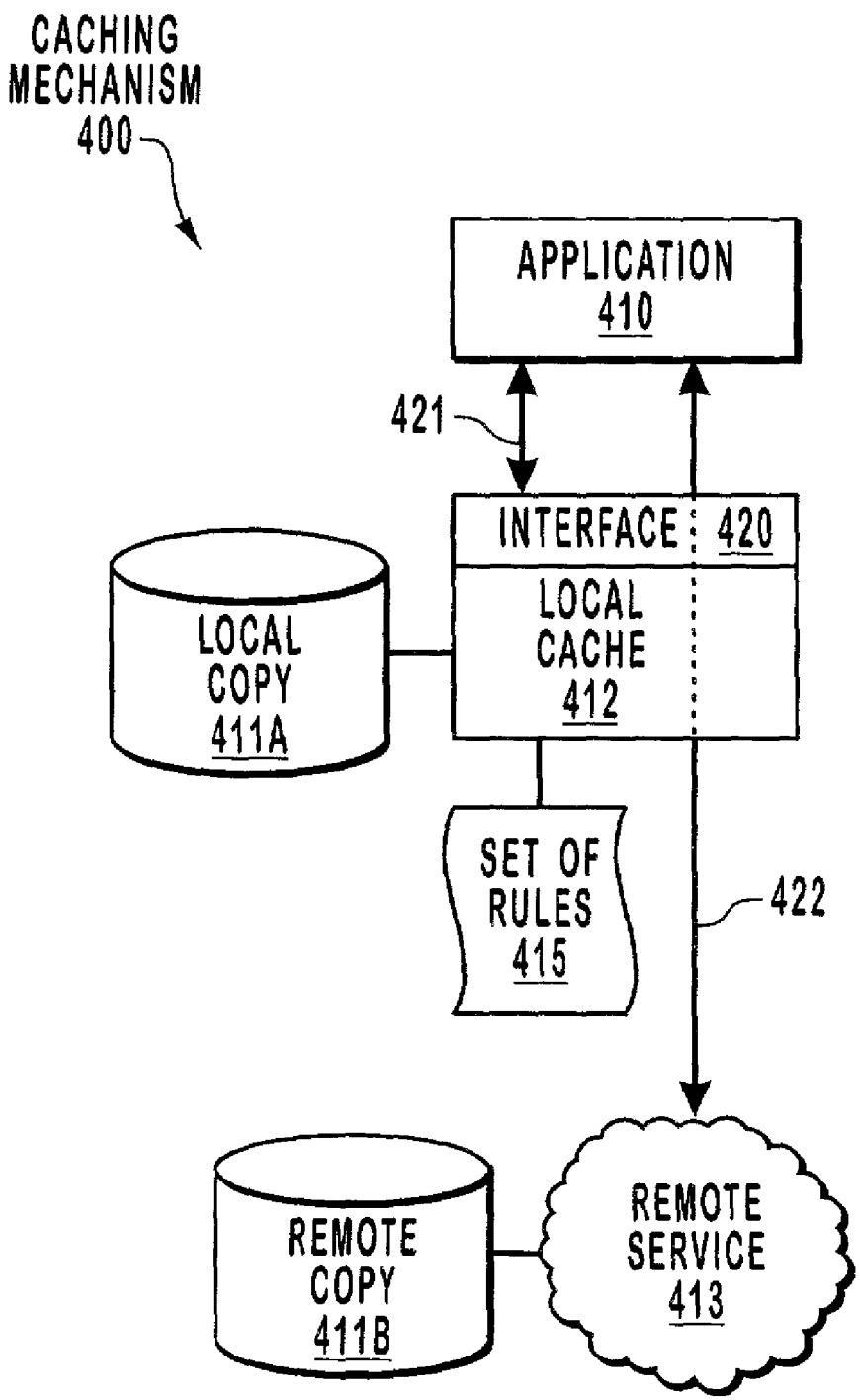
FIG. 4 illustrates a caching mechanism in accordance with the present invention.

FIG. 4 illustrates a caching mechanism 400 in accordance with the present invention. An application 410 may request to operate on a locally-cached copy of data 411A as represented by bi-directional arrow 421, or may request to operate on the remotely-stored copy of the data 411B maintained by a remote service 413 as represented by bi-directional arrow 422. Either way, the request is made to the local cache 412 via the interface 420. The local cache then uses a set of rules 415 to determine whether to perform the operation on the local copy 411A of the identified data, and whether to perform the operation on the remote copy 411B of the identified data.

In this description and in the claims, the terms "local" and "remote" are used only to differentiate logical nodes in a network. However, they are not used to necessarily describe a physical location. As used herein, a "remote" computer system and a "local" computer system represent different nodes in the network, without regard for their physical location. Accordingly, a "local" computer system and a "remote" computer system may, in fact, be sitting on the same desk.

The application 410 communicates with the local cache 412 via an interface 420. When the caching mechanism 400 is implemented in the computer system 320 of FIG. 3, for example, the application 410 may be, for example, one of the application programs 336. The local cache 412 may be another one of the application programs 336, or could also be a component in the operating system 335.

Figure 5:
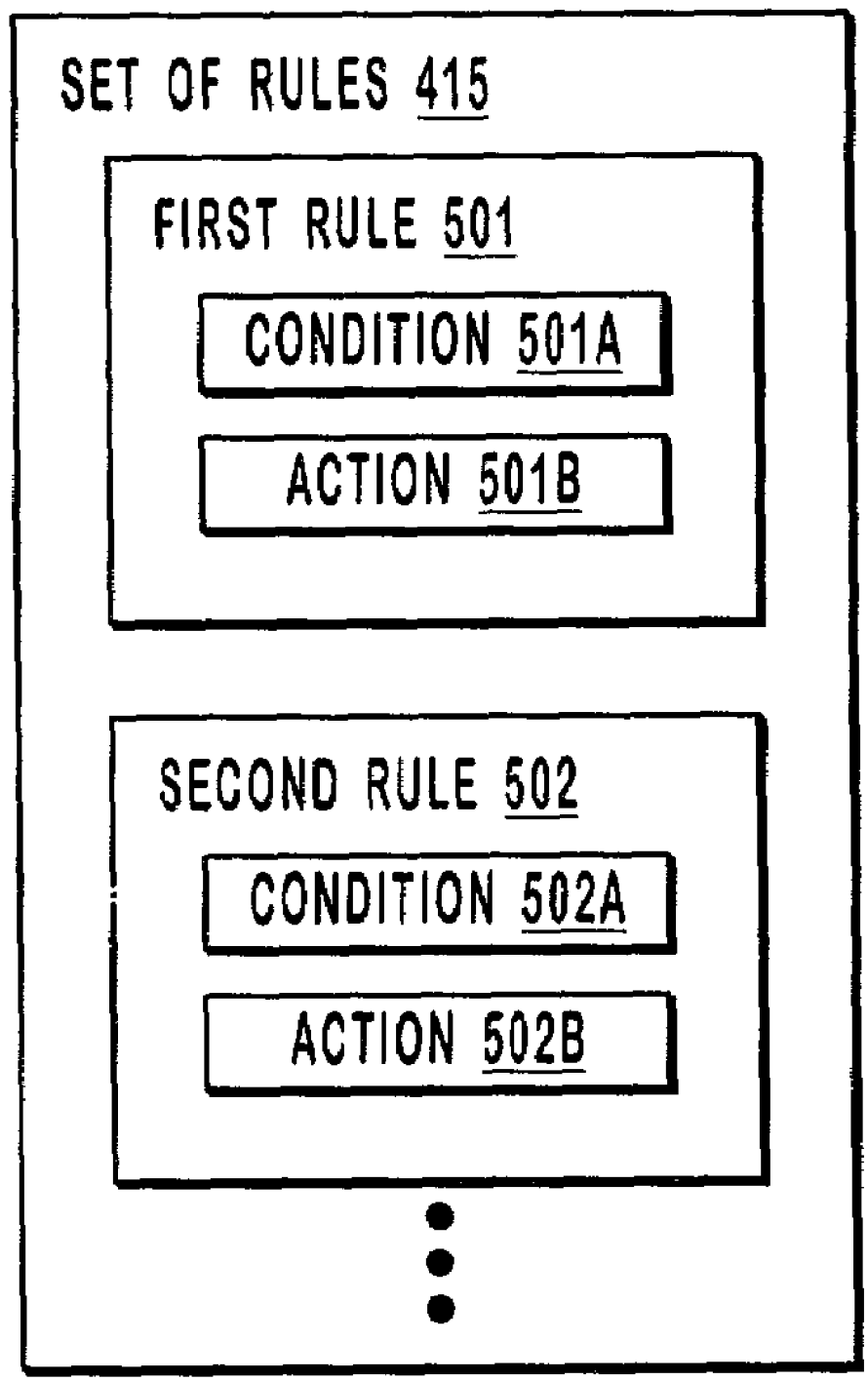
FIG. 5 illustrates a more detailed structure of the set of rules of FIG. 4.

FIG. 5 illustrates an example of a structure of the set of rules 415. The structure comprises a series of rules. Although only two fields that contain two rules 501 and 502 are illustrated, there may be any number (one or more) of rules in the set of rules. Each rule comprises a field that specifies a condition, and a field that specifies an action to take when the condition is satisfied. For example, the first rule 501 contains a condition 501A and an action 501B, while the second rule 502 contains a condition 502A and an action 502B. In one example, the set of rules are configured within a hierarchically-structured document such as an extensible Markup Language (XML) document. In that case, the condition 501A and the action 501B may be child nodes of the first rule 501 node. The condition 502A and the action 502B may be child nodes of the second rule 502.

In one example XML document structure, each condition node may include five types of child nodes, a service node, a dataArea node, a methodInvocation node, a connection node, and an event node.

The service node identifies the remote service 413. Although FIG. 4 illustrates one application 410 in communication with one remote service 413, there may be any number of available services on a network. For example, one service may be a contacts service that maintains contacts information, another may be a calendar service that maintains calendar information, and so forth. The service node identifies the service to which the parent rule applies. Methods of identification may include specifying a Uniform Resource Identifier (URI) of the service, or providing an alias name of the service (e.g., myContacts, myCalendar, and the like).

A dataArea node specifies the scope of the data to which the condition is to be applied. For example, if the data 411 was structured as a hierarchically-structured document such as an XML document, an XPath statement may be used to identify nodes of the XML document that the condition is to apply to. If multiple methods for specifying the scope of the data exist, then the dataArea node may also specify the specifying method used.

A methodInvocation node specifies what operations that condition is to be applied to. For example, the operations may include insert, delete, replace, update, and query request that are standard across all services including service 413, as well as custom methods that are particular to the service 413.

A connection node specifies the connection type(s), speed, or speed ranges that should be present in order for the condition to be satisfied. For example, possible values may be specified in Bits Per Second (BPS), or perhaps connection types such as DSL, Cable, EtherNet, 802.11b wireless, Bluetooth, or the like.

An event node may specify an event that should occur for the condition to be satisfied.

The action node may include several actions to be performed if the condition is satisfied. In one example, such actions may include flushWrites, refreshData, discardData, blockWrites, and blockReads. The blockWrites and blockReads actions are of particular interested to the caching architecture of FIG. 4, although all of these actions will now be described.

The flushWrites action directs the local cache 412 to propagate changes to the local copy 411A to the remote copy 411B via the remote service 413. However, only those data areas specified in the dataArea node of the condition would have changes propagated. This action may have two optional attributes. A minWriteDelay attribute, if specified, indicates that only the changes that are at least this old will be propagated to the service 413. A minWriteBuffer attribute, if specified, indicates that only writes that cause the total amount of data in a write queue to exceed this amount are propagated to the service 413.

The refreshData action directs the local cache 412 to retrieve changes from the service 413 in a process referred to a refreshing. Once again, only the data that is identified in the dataArea node of the condition node have changes retrieved from the service 413. One optional attribute is a minDataStaleness attribute which, when specified, directs that only data whose cached values can be more than this old are refreshed.

The discardData action directs the local cache 412 to discard the data specified in the data area node. One optional attribute is minMemory which, when specified, indicates the minimum space occupied by the identified data for it to be discarded. Another optional attribute is minTotalMemory which, when specified, indicates the minimum space occupied by all of the data in the cache (including any write queues) that would need to be present in order for the discard to occur.

A blockWrites action causes certain write operations to be blocked temporarily until the operations is sent to the service 413. If the caching mechanism is off-line with the service 413, connection is attemped. If the connection fails, the write operation may be indicated to fail as well. A minMemory attribute specifies the minimum space occupied by the write queue for the writing of the identified data to be blocked. A minTotalMemory attribute specifies the minimum space occupied by all of the data in the cache (including any write queues) in order to the write operation to be blocked.

A blockRead action causes read operations to block until the data is retrieved from the service 413. If a connection to the service 413 fails, the read operation may fail as well. A minDataStaleness attribute specifies that the read operations should only be blocked if the cached data it is attempting to retrieve is older that a specified age.

The following illustrates an example XML document having three primary rules. Line numbers is added for clarity in describing the XML document.

```
1.   <cacheSettings>
2.     <rule>
3.       <flush Writes minWriteDelay="10h"/>
4.       <refreshData minStaleness="10h"/>
5.       <discardData minMemory="10000000"
              minTotalMemory="20000000"/>
6.       <flushWrites minMemory="1000000"/>
7.     </rule>
8.     <rule>
9.       <condition type="and">
10.        <service name="myCalendar"/>
11.        <dataArea type="XPath" location="/"/>
12.        <condition type="or">
13.          <condition minSpeed="56K" maxSpeed="T1"/>
14.          <connection state="disconnected"/>
15.        </condition>
16.      </condition>
17.      <actions>
18.        <block Writes minWriteBuffer="1000000"/>
19.        <flushWrites minWriteDelay="1h"/>
20.        <blockReads minStaleness="1h"/>
21.        <refreshData minStaleness="30min"/>
22.      </actions>
23.      <rule>
24.        <condition>
25.          <connection state="idle">
26.        </condition>
27.        <actions>
28.          <flush Writes minWriteDelay="1min"/>
29.          <refreshData minStaleness="10min"/>
30.        </actions>
31.      </rule>
32.    </rule>
33.    <rule>
34.      <friendlyDescription>
35.        Do not sync attachments over modem
36.      </friendlyDescription>
37.      <condition type="and">
38.        <dataArea type="XPath" location="//attachments"/>
39.        <connection maxSpeed="56K"/>
40.      </condition>
41.      <actions>
42.        <blockReads minStaleness="infinite"/>
43.        <refreshData minStaleness="infinite"/>
44.      </actions>
45.    </rule>
46.  </cacheSettings>
```

Accordingly, the set of rules comprises 46 lines. The first rules spans from lines 2 though 7. The second rules spans from lines 8 through 32. The third rules spans from lines 33 through 45.

The first rule specifies no conditions. Accordingly, the specified actions are always performed. In particular, any writes that are more than 10 hours old are propagated to the remote data 411B (see line 3), or any cached data that is more than 10 hours old is refreshed by corresponding data from the service (see line 4). The identified data is discarded if the identified data is more than 10,000,000 bytes, or if the total cache space occupied is more than 20,000,000 bytes (see line 5). Also, any writes at all (regardless of staleness), are propagated to the service if the cache size exceeds 1,000,000 bytes.

The second rule does specify conditions that must occur before the corresponding actions are performed. The condition is that the service name be "myCalendar", that the identified data is identified by the XPath statement "/", and that the connection either be disconnected or somewhere between a 56K connection and a T1 connection inclusive (see lines 9 through 16). If this is true, then any write requests to the identified data in the local cache are blocked when the write queue exceeds 1,000,000 bytes (see line 18). Also, any writes that more than 1 hour old are propagated to the services (see line 19). Any request to read the identified data from the local cache are blocked if the local data is more than 1 hour stale (see line 20). In addition, any of the identified data to be read that is more than 30 minutes old is refreshed from the service (line 21).

There is also a child rule node within this second rule (see lines 23 through 31). This child node specifies additional conditions that must be satisfied in order to perform additional actions. For example, if the connection state is idle (see line 25), then the cache will propagate any writes that are older than 1 minute to the service (see line 28), and refresh any data that is older than 10 minutes (see line 29).

The third rule specifies that attachments are not to be synchronized over a modem (see the human-readable description node from lines 34 through 36). In particular, items from the XPath location "//attachment" (a storage area for attachments), are not read (see line 42) or refreshed (see line 43) no matter how stale the attachments are, unless the connection speed is greater than 56 kilobits per second (see line 39).

Accordingly, the data structure provides for fine-grained configuration of when and how to cache and synchronize, even allowing from blocking of read and write requests to the local cache when appropriate.

Figure 6:
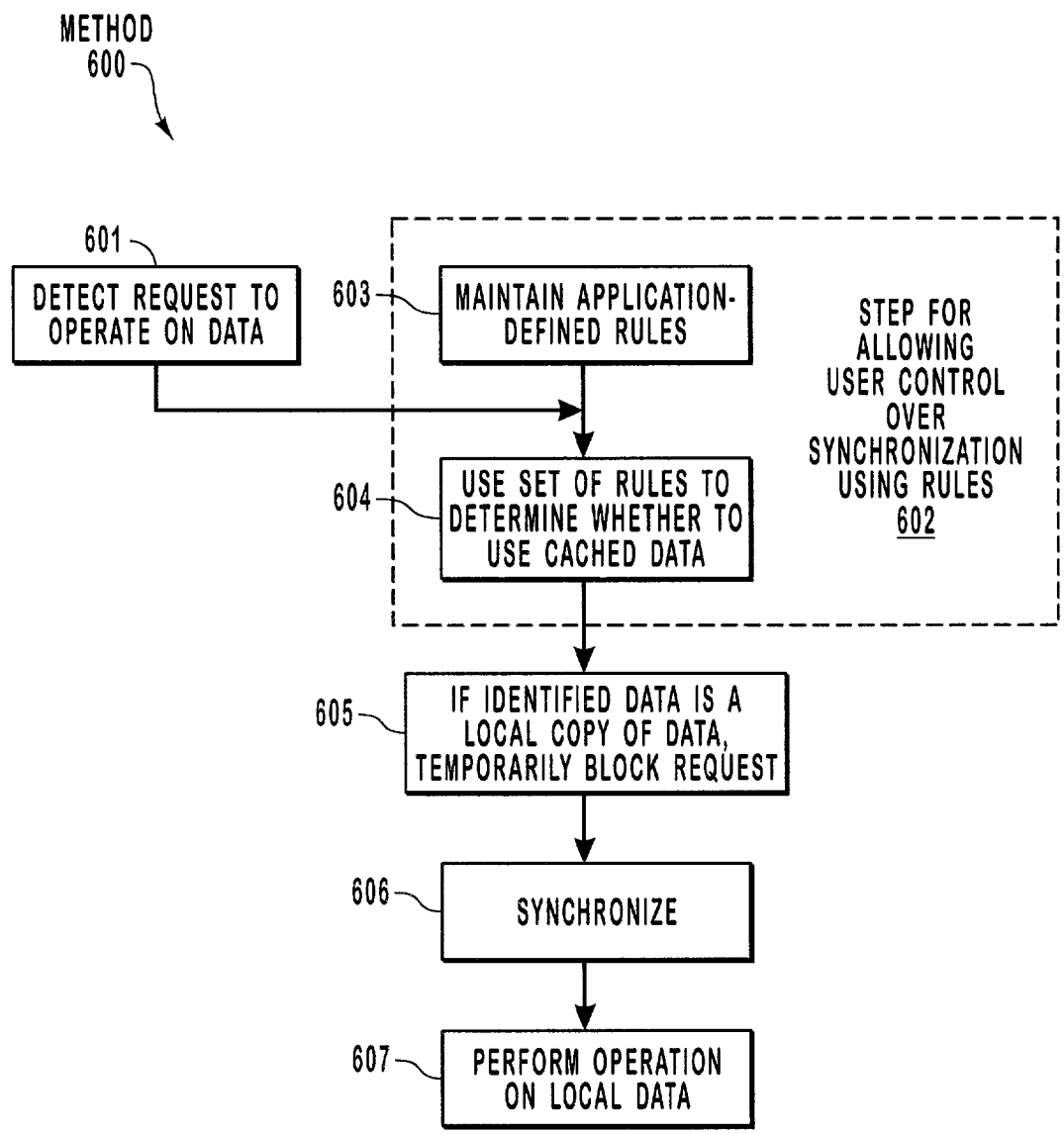
FIG. 6 illustrates a flowchart of a method for caching in accordance with the present invention

FIG. 6 illustrates a method 600 for caching network data in accordance with the present invention. The method 600 includes an act of detecting a request to operate on at least a version of the identified data that is stored on a network (act 601). The requested operation could be, for example, a read or write request, and may be for the local copy of the data, or for the remote copy of the data.

The method 600 also includes a functional result-oriented step for allowing user control over synchronization using rules (step 602). This step may include any corresponding acts for accomplishing this function. However, in the illustrated example, the step 602 includes corresponding acts 603 and 604.

In particular, the caching mechanism maintains a set of rules (act 603). These rules are configurable by a user, a network administrator, an application, and/or by default. The interface 420 allows for application and user to configure the set of rules. The caching mechanism then uses the set of rules to determine whether to respond to the request by operating upon a locally cached version of the identified data, and to determine whether to operate on the identified data in the server computer system (act 604).

The cache mechanism may temporarily block the request to operate upon the locally-cached copy of the identified data (act 605) under certain conditions. The caching mechanism then synchronizes the identified data (act 606), and then allows the operation to proceed (act 607). This blocking mechanism is quite useful as it allows for proper synchronization while a request is pending. Accordingly, the retrieved data may be much more fresh that might otherwise had been the case if the request had not been block. The principles of the present invention allow an application or user to configure when this blocking operation is important.

For example, when reading important data, the application or user may want relatively fresh data. Accordingly, the user might specify that if the data is older than a certain age, then block the request, synchronize the data, and then retrieve it. Similarly, for a write operation, it may be that a write operation is blocked if the write buffer of the cache is quite full. Instead, synchronization might be performed thereby reducing the size of the write buffer, and then the write operation is allowed to complete. Accordingly, the principles of the present invention allow for a highly-configurable way to govern caching operations, thereby allowing for more user and application control over when and how to perform caching.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a client computer system that is network connectable to a plurality of remote services, each remote service remotely storing and maintaining copies of corresponding application data, the client computer system including a caching mechanism for caching and accessing from a local cache, at the client computer system, locally cached copies of application data for any of the remote services, a method for implementing a data operation on application data, the method comprising the following:

an act of detecting an application request to perform a data operation on application data corresponding to a remote service selected from among the plurality of remote services, the application request indicating the location of one or more copies of the application data, selected from among a locally-cached copy of the application data and a remotely-stored copy of the application data;

an act of accessing a set of rules that were at least partially configured by a human, through an interface to the caching mechanism, the set of rules including processing conditions and processing actions that are individually configurable per remote service such that when an application request satisfies processing conditions for a remote service, the corresponding processing actions for the remote service are applied to the application request, including determining whether to adhere to accessing the application data from the locations indicated in the application request;

an act of identifying applicable rules, from within the set of rules, that are applicable to the corresponding remote service;

an act of applying processing actions corresponding to satisfied processing conditions of the identified applicable rules to determine if the caching mechanism is to adhere to accessing the application data from the locations indicated in the application request; and an act of performing the data operation on accessed application data in accordance with the outcome of the applied processing actions, even if application data is accessed from locations differing from the locations indicated in the application request.

2. A method in accordance with claim 1, wherein the act of performing the data operation on accessed application data in accordance with the outcome of the applied processing actions comprises an act of determining that the application request is to be responded to by implementing the data operation-on locally-cached copy of the application data, the method further comprising the following:

an act of temporarily blocking implementation of the data operation on the locally-cached copy of the application data; and an act of synchronizing at least some of the locally cached copy of the application data and some of the remotely stored copy of the application data with one another.

3. A method in accordance of claim 2, wherein the act of determining that the application request is to be responded to by implementing the data operation on the locally-cached copy of the application data comprises an act of requesting to read the locally-cached copy of the application data.

4. A method in accordance with claim 3, further comprising the following:
   an act of lifting the temporary block on implementation of the data operation on the locally-cached copy of the application data after the act of synchronizing.

5. A method in accordance with claim 2, wherein the act of determining that the application request is to be responded to by implementing the data operation on the locally cached copy of the application data comprises an act of requesting to write to the locally-cached copy of the application data.

6. A method in accordance with claim 5, wherein the act of synchronizing at least some of the locally-cached copy of the application data and some of the remotely stored copy of the application data with one another comprises the following:
   an act of performing the write operation upon the remotely stored copy of the application data; and
   an act of performing the write operation upon the locally-cached copy of the application data.

7. A method in accordance with claim 1, wherein the application data is at least a portion of a hierarchically-structured document.

8. A method in accordance with claim 1, wherein the act of accessing a set of rules that are at least partially configured by a human comprises an act of accessing a set of rules that are at least partially specifically configured to provide the application with appropriate access to copies of application data for the corresponding remote service and that are at least partially specifically configured to provide other applications with appropriate, yet different, access to copies of application data for other remote services.

9. A method in accordance with claim 1, wherein the act of accessing a set of rules that are at least partially configured by a human comprises an act of accessing a set of rules that are at least partially configured by a network administrator.

10. A method in accordance with claim 1, wherein the act of accessing a set of rules that are at least partially configured by a human comprises an act of accessing a set of rules that are at least partially configured by default.

11. A method in accordance with claim 1, wherein the act of accessing a set of rules that are at least partially configured by a human comprises an act of maintaining a hierarchically-structured document that includes a list of rules as nodes in the hierarchically-structured document.

12. A method in accordance with claim 1, wherein the act of accessing a set of rules that are at least partially configured by a human comprises an act of maintaining an XML document.

13. A method in accordance with claim 12, wherein each rule in the set of rules comprises a tag within the XML document.

14. A computer program product for use in a client computer system that is network connectable to a plurality of remote services, each remote service remotely storing and maintaining copies of corresponding application data, the client computer system including a caching mechanism for caching and accessing from a local cache, at the client computer system, locally-cached copies of application data for any of the remote services, the computer program product for implementing a method for implementing a data operation on application data, the computer program product comprising one or more computer-readable media having stored thereon the following:
   computer-executable instructions for detecting an application request to perform a data operation on application data corresponding to a remote service from among the plurality of remote services, the application request indicating locations of one or more copies of the application data, selected from among a locally-cached copy of the application data and a remotely-stored copy of the application data;
   computer-executable instructions for accessing a set of rules that were at least partially configured by a human, through an interface to the caching mechanism the set of rules including processing conditions and processing actions that are individually configurable per remote service such that when an application request satisfies processing conditions for a remote service, the corresponding processing actions for the remote service are applied to the application request, including determining whether to adhere to accessing the application data from the locations indicated in the application request;
   computer-executable instructions for identifying applicable rules, from within the set of rules, that are applicable to the corresponding remote service;
   computer-executable instructions for applying processing actions corresponding to satisfied processing conditions of the identified applicable rules to determine if the caching mechanism is to adhere to accessing application data from the locations indicated in the application request; and
   computer-executable instructions for performing the data operation on accessed application data in accordance with the outcome of the applied processing actions, even if application data is accessed from locations differing from the locations indicated in the application request.

15. A computer program product in accordance with claim 14, wherein the one or more computer-readable media are physical storage media.

16. A computer program product in accordance with claim 14, wherein the computer-executable instructions for applying processing actions corresponding to satisfied processing conditions of the identified applicable rules to determine if the caching module is to adhere to accessing application data from the locations indicated in the application request comprise computer-executable instructions for determining that the application request is to be responded to by implementing the data operation on a locally-cached copy of the application data, the one or more computer-readable media further having stored thereon the following:
   computer-executable instructions for temporarily blocking implementation of the data operation the locally-cached copy of the application data; and
   computer-executable instructions for synchronizing at least some of the locally-cached copy of the application data and some of the remotely stored copy of the application data with one another.

17. A computer-program product in accordance of claim 16, wherein the request to operate on the locally-cached copy of the application data is a request to read the locally-cached copy of the application data, wherein the one or more computer-readable media further have stored thereon the following:

computer-executable instructions for lifting the temporary block on implementation of the data operation on the locally-cached copy of the application data after synchronizing.

18. A computer-program product in accordance with claim 16, wherein the computer-executable instructions for synchronizing at least some of the locally-cached copy of the application data and some of the remotely stored copy of the application data with one another comprise the following:

computer-executable instructions for performing the write operation upon the remotely stored copy of the application data; and computer-executable instructions for performing the write operation upon the client side copy of the application data.

19. A client computer system comprising the following:

one or more processors;

system memory;

a network interface providing network connectability to a plurality of remote services that store and maintain copies of application data;

a persistent caching memory; and one or more computer-readable media having stored thereon computer-executable instructions that, when executed by the one or more processors, causes the following to be formed in system memory:

a data structure that represents a set of caching rules for the plurality of remote services and corresponding applications, at least some of the caching rules specifically for use with a first remote service and corresponding first application and at least some of the caching rules specifically for use with a second different remote service and corresponding second application, the set of rules for determining whether to perform data operations on one or both of locally-cached copies of application data in the persistent caching memory and remotely stored copies of application data stored and maintained at remote services, in adherence with the application data access indicated in application requests;

a user interface configured to receive input from at least one of a human and the first and second applications and configured to change the set of caching rules for the first and second remote services based on the input from the at least one of a human and the first and second specified applications such that caching rules for the first and second remote services can be configured to implement caching and synchronization differently for the first and second remote services; and a caching module configured to:

locally cache copies of application data in the persistent caching memory and to access locally-cached copies of application data from the persistent caching memory;

receive requests from the first and second specified applications to perform data operations on application data; and use applicable caching rules, from within the set caching rules, specific to the first remote service to perform a requested data operation on one or both of a locally-cached copy of application data cached in the persistent caching memory and a remotely stored copy of the application data stored and maintained at the first remote service, even if resulting access to copies of the application data does not adhere to the access indicated in an application request from the first application.

20. The method as recited in claim 1, wherein an act of accessing a set of rules that were at least partially configured by a human specifically for use with the application comprises an act of accessing a set of caching rules that includes one or more human configurable condition/action pairs, each condition indicating an event that is to occur for the condition to be satisfied, each action indicating an action to take when a corresponding condition is satisfied.

21. A method in accordance with claim 1, wherein the act of applied processing actions indicating that copies of the application data differing from those indicated in the application request are to be accessed comprises an act of the applied processing actions intervening to override the indications of application data locations in the application request.

22. A method in accordance with claim 21, wherein the act of the applied processing actions intervening to override the indications in the application request comprises an act of the applied processing actions indicating that a remotely stored copy of the application data is to be accessed even though the application request indicated that a locally-cached copy of the application data was to be accessed.

23. A method in accordance with claim 22, wherein the act of the applied processing actions indicating that a remotely stored copy of the application data is to be accessed even though the application request indicated that a locally-cached copy of the application data was to be accessed comprises an act of determining that the locally-cached copy of the application is stale based on freshness requirements for the remote service.

24. The system as recited in claim 19, wherein the caching module is further configured to:

use applicable caching rules, from within the set caching rules, specific to the second remote service to determine whether to perform a requested data operation on one or both of a locally-cached copy of application data cached in the persistent caching memory and copy of the application data remotely stored and maintained at the second remote service, even if resulting access to copies of the application data does not adhere to the access indicated in an application request from the second application.

* * * * *